Jan. 6, 1970  R. F. VAN LIGTEN ET AL  3,488,101
HOLOGRAPHIC RECORDING SYSTEM IN WHICH IMAGE
RESOLUTION EXCEEDS MAXIMUM FILM RESOLUTION
Filed Dec. 14, 1964                                2 Sheets-Sheet 1
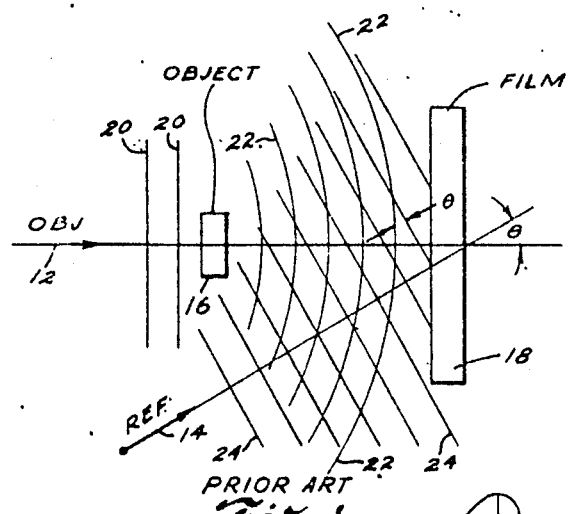
PRIOR ART
Fig. 1
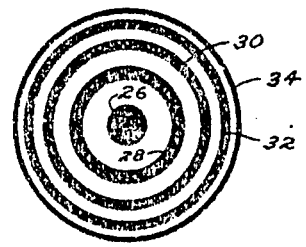
Fig. 2
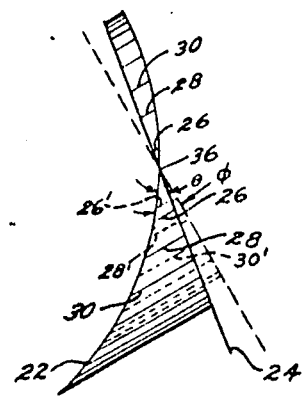
Fig. 3
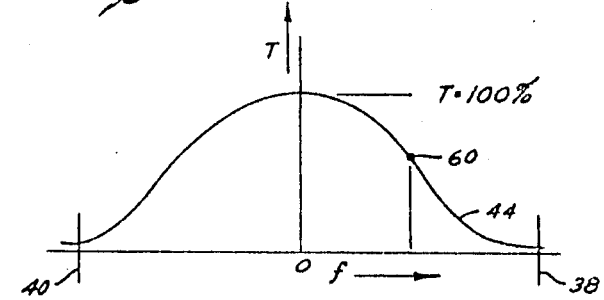
Fig. 4
Fig. 5
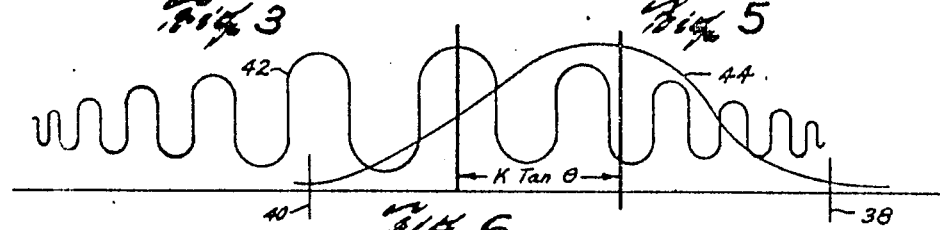
Fig. 6
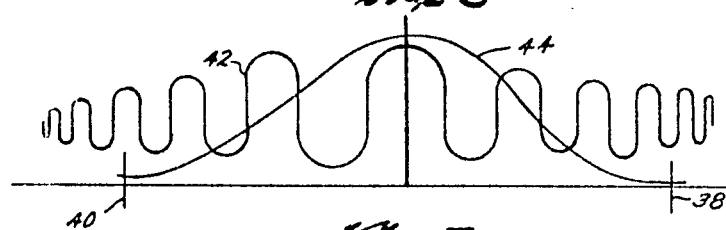
Fig. 7
INVENTORS
RAOUL F. VAN LIGTEN
ELIAS SNITZER
BY
S. Albert Hultquist
ATTORNEY

United States Patent Office 3,488,101
Patented Jan. 6, 1970

3,488,101
HOLOGRAPHIC RECORDING SYSTEM IN WHICH IMAGE RESOLUTION EXCEEDS MAXIMUM FILM RESOLUTION
Raoul F. van Ligten, Worcester, and Elias Snitzer, Sturbridge, Mass., assignors to American Optical Company, Southbridge, Mass., a voluntary association of Massachusetts
Filed Dec. 14, 1964, Ser. No. 417,935
Int. Cl. G02b 27/00
U.S. Cl. 350—3.5                                    1 Claim

ABSTRACT OF THE DISCLOSURE

A hologram apparatus for recording the image of an object on a film having a resolution limit lower than the required resolution limit of the image of the object. The object is illuminated so as to propagate wavefronts from object to the film. A point reference object points in the object to the film. A point reference source mutually coherent with these wavefronts propagates a spherical wavefront reference beam to the film. The point reference source is located sufficiently close to the object such that for any object point the normals at the film to the intersecting spherical wavefronts emanating respectively from the object point and the point reference source are at an angle small enough to form an interference pattern on the film which has spatial frequencies all of which are less than the resolution limit of the film. Thus an image of the object can be reconstructed from the film, which reconstructed image has a resolution finer than the resolution limit of the film.

---

This invention relates generally to hologram systems and more particularly to improvements in such systems whereby all of the details of the recorded image are caused to be within the resolution limits of the hologram film.

The phenomenon of holograms can best be understood by reference to an article in the Journal of the Optical Society of America, vol. 53, p. 1377 (1963). In that article, E. Leith and J. Upatnieks describe a method for producing a two-beam hologram in which an object transparency (or the object itself) is illuminated with monochromatic spatially coherent light and a diffraction pattern of the object is formed on a film. Adjacent to the object, a prism intersects half of the coherent beam and deviates it through an angle sufficient to superimpose it, with the object-bearing portion of the beam, on the film, which acts as a square law detector and records an interference pattern of the two beams and an image of the object. The film, when developed by ordinary photographic techniques, is a hologram of the object with the recorded interference pattern being analogous to a modulated carrier such as the temporal carrier wave used in communication systems.

In a subsequent Journal of the Optical Society of America article, vol. 54, p. 1295 (1964), Leith and Upatnieks describe other methods for producing a two-beam hologram, all of which involve the deviation of a part of the coherent light so that it impinges at an angle to the object-bearing portion of the beam on the film. A schematic representation of a typical hologram system, such as those described in the aforementioned articles, is shown in FIG. 1 with a representation of the wave fronts of the respective beams and their intereference upon reaching the film. It will be described in more detail how the hologram image is affected by the use of a flat wave front reference beam, which is incident to the film at an angle; but for the purposes of this introduction, it is sufficient to state that the resolution limit of the film present a limitation to the resolution capability of a recorded image of the object on the film. This limitation causes a severe problem as far as recording the finer features of the object image on the film is concerned.

Accordingly, a primary object of the present invention is to increase the capability of a hologram system to record the finer features of an object image on a film.

A more specific object is to increase the capability of the hologram system to record all details of an object image on a film within the resolution limits of the film, without regard to these limits.

These and other objects are accomplished in one illustrative embodiment of the invention wherein a point reference beam source is placed at the object to emit a reference beam with a spherical wave front for propagation parallel to the spherical wave front, which has been diffracted through the object, that is, the normals to both wavefronts at their intersection at any point on the film are parallel.

Other objects, features, embodiments and modifications thereof will be described and explained in the following more detailed description of the invention, with reference to the accompanying drawings, wherein:

FIG. 1 is a schematic representation of a hologram system using presently available techniques;

FIG. 2 is a representation of a Bessel function created by interference between a disk-object diffracted beam and a reference beam at the film using the system according to FIG. 1 (a disk-object is considered as representation of a small part of any finite object for the purposes of the description);

FIG. 3 is a representation of an interference pattern between the disk-object and reference beams of FIG. 1, depicting the result of increasing the angle between said beams;

FIG. 4 is a graphical representation of a portion of a sinusoidal amplitude record of an image or object;

FIG. 5 is a graphical representation of the transfer function for a typical film, such as that which is used in a hologram system;

FIG. 6 is a graphical representation of a Fraunhofer diffraction pattern for a recorded image and its relation to the transfer function of FIG. 5 when an angle $\theta$ exists between the object and reference beams;

FIG. 7 is a graphical representation of a Fraunhofer diffraction pattern and its relation to a transfer function, such as that shown in FIG. 5, when no angle exists between the disk-object spherical wave front and reference beam flat wave front;

Figure 8:
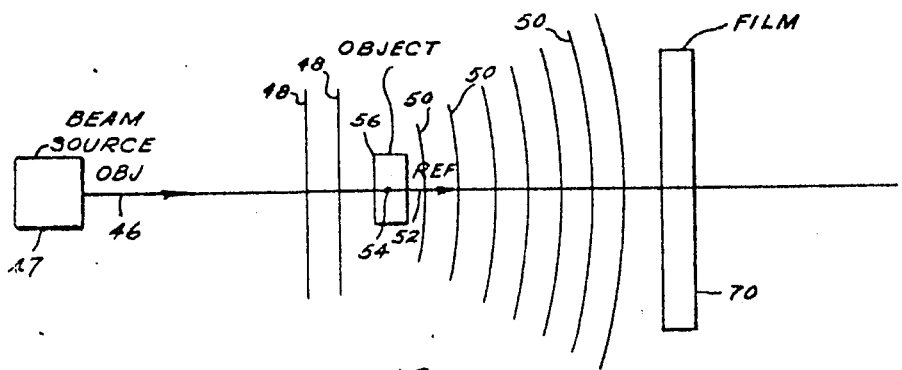
FIG. 8 is a schematic representation of a hologram system according to the present invention, wherein the source of the reference beam is placed at the point of the disk-object so that it emits a spherical wave front beam coincident with the diffracted wave front of the disk-object image-bearing beam.

Referring first to FIG. 1, there is shown a hologram arrangement such as that commonly used in the art at the present time. A source of coherent light (not shown) is split into object beam 12 and reference beam 14 (by conventional means, not shown) the reference beam being deviated around the disk-object 16 and both the object and reference beams ultimately impinging upon hologram film 18, which is standard photographic film to be developed by ordinary photographic means. (Two separate sources may be used for the two beams, as long as they have the same characteristics.) Object beam 12 initially has flat wave fronts 20, but upon being diffracted by disk-object 16, the flat wave fronts become spherical wave fronts 22. Reference beam 14 has flat wave fronts 24 which interfere with the spherical fronts 22 at an angle which can be approximated by the angle θ, or the angle between the directions of propagation of the object and reference beams. This interference is in the form of a representation of its Bessel function, and, as shown in FIG. 2, forms a large central bright area 26, and other rings of brightness 28, 30, 32 and 34, which decrease in breadth as the distance from the center of the Bessel function representation increases, and which decrease in distance from the previous ring as the distance from the center increases. The interference pattern may also be depicted by the representation of FIG. 3 wherein the lines of interference (solid lines) 26, 28, 30, etc. increase in frequency when the distance from the center 36 increases.

FIG. 4 shows the usual sinusoidal representation of the amplitude of an image to be recorded, which has a maximum amplitude of $a$ relative to the ground level and a minimum amplitude of $b$ relative to the ground level. The contrast of this image can be represented by the ratio $$\frac{a-b}{a+b}$$

The graph of FIG. 4 can also be used to represent the object, which the image represents, and the contrast of the object may be stated in terms of the same ratio, $$\frac{a-b}{a+b}$$

The ratio of the image contrast to the object contrast is usually less than 100% because of the losses attendant in most systems. That percentage ratio is commonly referred to as the transfer function T of the film, which is plotted against frequency $f$ in the graph of FIG. 5. The frequency $f$ of that graph represents the frequency capability of the film due to its grain size and spacing. There is an optimum frequency at which the transfer function approaches 100%, and any increase in frequency from that point decreases the transfer function until a cut-off 38 is reached. Likewise, any decrease in frequency from the 100% transfer function point decreases the transfer function until a cut-off point 40 is reached.

FIG. 6 represents a graph of the Fraunhofer or far field intensity pattern 42 of the image, which, for any recording on film, is multipled by the transfer function 44. It may be seen that with the use of a flat wave front reference beam propagated at an angle θ to the wave fronts of the object beam, the transfer function 44 will be displaced by a constant K times the tangent of angle θ for multiplication by the Fraunhofer intensity pattern 42. FIG. 6 shows clearly that the cut-off 40 will then occur in such a way as to remove some of the information contained in the central portion of pattern 42. As this angle is increased (as is shown by FIG. 3) the frequency will be increased at a shorter distance from the central portion. This is represented by the dotted interference lines of FIG. 3, which have been plotted as equal in length to their corresponding interference lines for the smaller angle. By way of explanation, if the interference line 26 is considered to be two wavelengths long, for the wider angle φ the corresponding interference line 26′ must also be two wavelengths long. Therefore, as the angle is increased, the cut-off frequency points 38 and 40 are exceeded with less of the Fraunhofer intensity pattern 42 than with a lesser angle. One remedy to this situation is to cause the source of a flat wave front reference beam to emanate from a point such that its line of propagation will be parallel to the direction of propagation of the object beam. However, FIG. 7 shows that the cut-off points 38 and 40 would still exist to thereby cause a clear image for gross detail near the center portion of the Fraunhofer pattern, but no image of the finer details of the object.

The present invention contemplates a hologram system such as that shown in FIG. 8. In that system, an object beam 46 is propagated from a source 47 with a flat wave front 48 through the disk-object 56, so that the wave front is then spherical, as shown and represented by lines 50. The reference beam 52 emanates from a point source 54 placed at the point of the disk-object 56 (but still not propagated therethrough) and can be accomplished with a separate coherent light source or with the use of the object beam and lenses. In this way, the spherical reference beam wave front is parallel at any point on the film plane with the spherical wave front of the intersecting object beam. This is equivalent to saying that the normals to the wavefronts are parallel at any point on the film where the wavefronts intersect. The two wave fronts, therefore, never interfere and the frequency of the interference pattern is then zero or at the $T=100\%$ point on the transfer function 44 for the film 70 (FIG. 5). The essence of what has been done, in terms of the FIG. 7 representation, is that the diffraction pattern has been compressed to a substantially vertical segment at the zero frequency point of the transfer function curve. As long as the interference pattern frequency remains at zero, cut-off points 40 and 38 of the FIG. 5 transfer function curve will never be reached. The image, of course, is then carried by a D-C type (straight line) record of the intensity of the two beams, which represents no interference of the beams.

Figure 9:
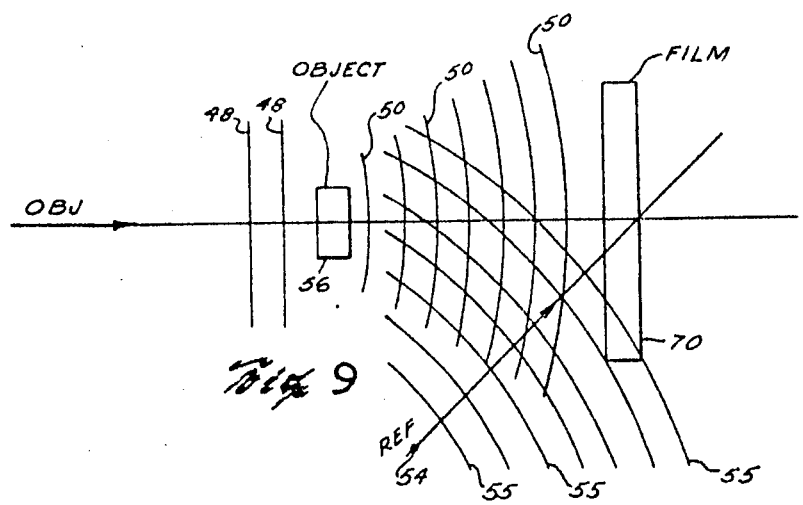
FIG. 9 is a schematic representation of a hologram system and the position of wave fronts when a spherical beam is emitted in the object plane, but at a distance from the disk-object, so that the reference beam impinges on the film at an angle to the object beam.
Figure 10:
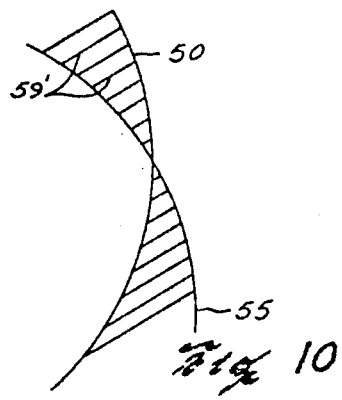
FIG. 10 is a representation of the interference between the reference and object beams of FIG. 9; and, FIG. 11 is a representation of a plot of an interference pattern for the beams of FIG. 9.
Figure 11:

An extension of a system of FIG. 8 might be to place reference beam source 54 at a point separated from disk-object 56, as shown in FIG. 9. The arrangement in that figure is the equivalent of keeping the reference beam source fixed, and moving the disk-object away from the common axis of these beams, but still in a plane parallel to the plane of disk-object. Such an arrangement produces spherical wave fronts 55 from the reference beam with a resultant interference pattern 59′ and 59 being formed that has, as shown in FIGS. 10 and 11, a constant frequency. As the angle between the spherical wave front reference beam and the spherical wave front object beam is increased, the frequency of the interference patterns of FIGS. 10 and 11 will be increased also (such as to point 60 in FIG. 5) until the cut-off points 38 or 40 of the transfer function of FIG. 5 are reached.

It may then be seen that the effects of an increase in the angle between the normals of the two beams at the film, where the reference beam has a flat wave front (as shown in FIG. 3) is a problem of resolution or the ability of the film, which has a particular grain size and spacing, to record the finer details to an object; and the effects of the increase in the angle between the normals of the two wave fronts, where the reference beam has a spherical wave front (as shown in FIG. 10) is a problem in field of view. Both of these resolution and field of view problems are untenable in a hologram system, so that the apparatus of FIG. 8, with the spherical wave front reference beam emanating in such a way as to have its wave front substantially parallel to the spherical wave front of the object beam at any point on the film, is desirable. Theoretically, the apparatus of FIG. 8 is desired, but an approximation in which the angle between the spherical wave fronts is at a minimum, so as to have as low a frequency as possible within the limits of the transfer function, will suffice, since the reference beam for any hologram system must always be deviated around the object. In that way, the resolution capability of the film is not exceeded and both fine and gross details of the object may be recorded on the film 70 of FIG. 8.

We claim:

1. A hologram apparatus for recording the image of an object on a film having a resolution limit lower than the required resolution limit of the image of said object consisting of a film, means for illuminating said object to propagate wavefronts from object points in said object to said film, and a point reference source mutually coherent with said wavefronts for propagating a spherical wavefront reference beam to said film, said point reference source being located sufficiently close to said object such that for any object point the normals at the film to the intersecting spherical wavefronts emanating respectively from the object point and the point reference source are at an angle small enough to form an interference pattern on said film which has spatial frequencies all of which are less than the resolution limit of said film, whereby an image of said object can be reconstructed from the film, which reconstructed image has a resolution finer than the resolution limit of the film.

References Cited

UNITED STATES PATENTS 2,770,166    11/1956    Gabor _____ 350—3.5
2,982,176    5/1961    Kay.

OTHER REFERENCES.

Vander Lugt, Signal Detection by Complex Spatial Filtering, University of Michigan, July 1963, p. 17.

Leith et al., Jour. of the Optical Society of America, vol. 54, No. 11, November 1964, pp. 1295–1301.

Gabor, Dennis, Nature, vol. 161, No. 4098, May 15, 1948, pp. 777–778.

DAVID SCHONBERG, Primary Examiner

R. J. STERN, Assistant Examiner